(12) United States Patent
McLean et al.

(10) Patent No.: US 9,118,042 B2
(45) Date of Patent: *Aug. 25, 2015

(54) FLUIDIC DISTRIBUTION SYSTEM AND RELATED METHODS

(75) Inventors: Gerard F. McLean, West Vancouver (CA); Joerg Zimmermann, Vancouver (CA); Jeremy Schrooten, Mission (CA); Paul Sobejko, North Vancouver (CA)

(73) Assignee: Intelligent Energy Limited, Loughborough (GB)

( * ) Notice: Subject to any disclaimer, the term of this patent is extended or adjusted under 35 U.S.C. 154(b) by 839 days.

This patent is subject to a terminal disclaimer.

(21) Appl. No.: 13/401,344

(22) Filed: Feb. 21, 2012

(65) Prior Publication Data

US 2012/0148932 A1 Jun. 14, 2012

Related U.S. Application Data

(63) Continuation of application No. 12/053,408, filed on Mar. 21, 2008, now Pat. No. 8,133,629.

(60) Provisional application No. 60/919,470, filed on Mar. 21, 2007.

(51) Int. Cl.
*H01M 8/04* (2006.01)
*H01M 8/02* (2006.01)
*H01M 8/24* (2006.01)

(52) U.S. Cl.
CPC ........ *H01M 8/0258* (2013.01); *H01M 8/04089* (2013.01); *H01M 8/04753* (2013.01); *H01M 8/241* (2013.01); *Y02E 60/50* (2013.01)

(58) Field of Classification Search
None
See application file for complete search history.

(56) References Cited

U.S. PATENT DOCUMENTS

| | | |
|---|---|---|
| 3,176,714 A | 4/1965 | Smith et al. |
| 3,531,079 A | 9/1970 | Greene |
| 4,320,789 A | 3/1982 | Martin et al. |
| 4,360,569 A | 11/1982 | Steyert et al. |
| 4,396,114 A | 8/1983 | Golben et al. |
| 4,583,638 A | 4/1986 | Bernauer et al. |
| 4,607,826 A | 8/1986 | Ron |
| 4,667,815 A | 5/1987 | Halene |
| 4,799,360 A | 1/1989 | Retallick et al. |

(Continued)

FOREIGN PATENT DOCUMENTS

| | | |
|---|---|---|
| CA | 2169826 | 3/1995 |
| CA | 2535566 A1 | 7/2005 |

(Continued)

OTHER PUBLICATIONS

"U.S. Appl. No. 12/053,374, Applicant-Initiated Interview Summary mailed May 30, 2013", 3 pgs.

(Continued)

*Primary Examiner* — Krishnan S Menon
(74) *Attorney, Agent, or Firm* — Baker & Hostetler LLP

(57) ABSTRACT

Embodiments of the present invention relate to a fluid distribution system. The system may include one or more electrochemical cell layers, a bulk distribution manifold having an inlet, a cell layer feeding manifold in direct fluidic contact with the electrochemical cell layer and a separation layer that separates the bulk distribution manifold from the cell feeding manifold, providing at least two independent paths for fluid to flow from the bulk distribution manifold to the cell feeding manifold.

22 Claims, 5 Drawing Sheets

(56) References Cited

U.S. PATENT DOCUMENTS

| | | |
|---|---|---|
| 5,360,461 A | 11/1994 | Meinzer |
| 5,388,635 A | 2/1995 | Gruber et al. |
| 5,527,638 A | 6/1996 | Kinoshita et al. |
| 5,685,456 A | 11/1997 | Goldstein |
| 6,158,712 A | 12/2000 | Craig |
| 6,159,629 A | 12/2000 | Gibb et al. |
| 6,258,198 B1 | 7/2001 | Saito et al. |
| 6,267,229 B1 | 7/2001 | Heung |
| 6,321,791 B1 | 11/2001 | Chow |
| 6,431,212 B1 | 8/2002 | Hayenga |
| 6,432,379 B1 | 8/2002 | Heung |
| 6,518,675 B2 | 2/2003 | Kim et al. |
| 6,520,219 B2 | 2/2003 | Sapovalov et al. |
| 6,528,198 B1 | 3/2003 | Jones et al. |
| 6,561,208 B1 | 5/2003 | O'Connor et al. |
| 6,619,311 B2 | 9/2003 | O'Connor et al. |
| 6,626,323 B2 | 9/2003 | Stetson et al. |
| 6,651,659 B2 | 11/2003 | Izuchukwu |
| 6,755,211 B1 | 6/2004 | O'Connor et al. |
| 6,756,019 B1 | 6/2004 | Dubrow et al. |
| 6,821,666 B2 | 11/2004 | Morse et al. |
| 6,857,449 B1 | 2/2005 | Chow |
| 6,890,067 B2 | 5/2005 | Hock et al. |
| 6,929,030 B2 | 8/2005 | Unger et al. |
| 6,970,485 B1 | 11/2005 | Kitayama et al. |
| 6,986,961 B1 | 1/2006 | Ren et al. |
| 7,008,309 B2 | 3/2006 | Strasbaugh |
| 7,168,680 B2 | 1/2007 | Koeneman |
| 7,169,214 B2 | 1/2007 | Kubo et al. |
| 7,404,842 B1 | 7/2008 | Wainright et al. |
| 7,651,554 B2 | 1/2010 | Tan et al. |
| 7,883,670 B2 | 2/2011 | Tonkovich et al. |
| 7,926,650 B2 | 4/2011 | Zimmermann et al. |
| 8,133,629 B2 * | 3/2012 | McLean et al. ............. 429/452 |
| 8,173,326 B2 | 5/2012 | Lundblad et al. |
| 8,679,694 B2 | 3/2014 | Zimmermann et al. |
| 2002/0066424 A1 | 6/2002 | Fedorowicz et al. |
| 2002/0164518 A1 | 11/2002 | Wilkinson et al. |
| 2002/0187072 A1 | 12/2002 | Karp |
| 2003/0064275 A1 | 4/2003 | Morse et al. |
| 2003/0124409 A1 | 7/2003 | Cramer et al. |
| 2003/0136453 A1 | 7/2003 | Johnson |
| 2003/0229385 A1 | 12/2003 | Elkins |
| 2004/0062965 A1 | 4/2004 | Morse et al. |
| 2004/0065171 A1 | 4/2004 | Hearley et al. |
| 2004/0079424 A1 | 4/2004 | Takeda et al. |
| 2004/0086869 A1 | 5/2004 | Schembri |
| 2004/0119038 A1 | 6/2004 | Crockett |
| 2004/0137300 A1 | 7/2004 | Gemmen et al. |
| 2004/0209142 A1 | 10/2004 | Becerra et al. |
| 2005/0064256 A1 | 3/2005 | Morse et al. |
| 2005/0072946 A1 | 4/2005 | Studer et al. |
| 2005/0158188 A1 | 7/2005 | Matsui et al. |
| 2005/0188847 A1 | 9/2005 | Fujita et al. |
| 2005/0221147 A1 | 10/2005 | Shioya et al. |
| 2005/0250004 A1 | 11/2005 | McLean et al. |
| 2006/0021882 A1 | 2/2006 | Kaye et al. |
| 2006/0042698 A1 | 3/2006 | Koeneman et al. |
| 2006/0108004 A1 | 5/2006 | Nakamura |
| 2006/0127734 A1 | 6/2006 | McLean et al. |
| 2006/0141328 A1 | 6/2006 | Johnston et al. |
| 2006/0147787 A1 | 7/2006 | Yamauchi et al. |
| 2006/0222915 A1 | 10/2006 | Sumino et al. |
| 2006/0237688 A1 | 10/2006 | Zimmermann |
| 2006/0269821 A1 | 11/2006 | Nakagawa et al. |
| 2007/0026269 A1 | 2/2007 | Nakakubo |
| 2007/0056634 A1 | 3/2007 | Yokoi et al. |
| 2007/0077470 A1 | 4/2007 | Adams et al. |
| 2007/0090786 A1 | 4/2007 | McLean |
| 2007/0190379 A1 * | 8/2007 | Song et al. ............. 429/24 |
| 2007/0295617 A1 | 12/2007 | Zimmermann |
| 2008/0143098 A1 | 6/2008 | Zimmermann |
| 2008/0145736 A1 | 6/2008 | Pratt et al. |
| 2008/0230401 A1 | 9/2008 | Zimmermann et al. |
| 2008/0233446 A1 | 9/2008 | Zimmermann et al. |
| 2008/0248352 A1 | 10/2008 | McLean et al. |
| 2008/0311458 A1 | 12/2008 | Schrooten et al. |
| 2009/0081493 A1 | 3/2009 | Schrooten et al. |
| 2010/0035102 A1 | 2/2010 | Zimmermann |
| 2010/0035110 A1 | 2/2010 | Lundblad |
| 2010/0258214 A1 | 10/2010 | Zimmermann |
| 2012/0264036 A1 | 10/2012 | Schrooten et al. |

FOREIGN PATENT DOCUMENTS

| | | |
|---|---|---|
| CN | 1133080 | 10/1996 |
| CN | 1623247 | 6/2005 |
| CN | 1623247 A | 6/2005 |
| CN | 1726348 | 1/2006 |
| CN | 1841825 A | 10/2006 |
| CN | 1867795 | 11/2006 |
| EP | 1498971 A2 | 1/2005 |
| EP | 2124281 A1 | 11/2009 |
| JP | 2002-515351 A | 5/2002 |
| JP | 2003-531018 A | 10/2003 |
| JP | 2004-031199 | 1/2004 |
| JP | 2004130219 A | 4/2004 |
| JP | 2004151109 A | 5/2004 |
| JP | 2005-516770 A | 6/2005 |
| JP | 2006009961 A | 1/2006 |
| JP | 2006153609 A | 6/2006 |
| JP | 2006269355 A | 10/2006 |
| JP | 2007107715 A | 4/2007 |
| JP | 2008082543 A | 4/2008 |
| SG | 155569 A1 | 10/2012 |
| WO | WO-9508716 A2 | 3/1995 |
| WO | WO-9959810 A2 | 11/1999 |
| WO | WO-0178893 A2 | 10/2001 |
| WO | WO-0178893 A3 | 10/2001 |
| WO | WO-0230560 A2 | 4/2002 |
| WO | WO-2002035666 A1 | 5/2002 |
| WO | WO-03032412 A2 | 4/2003 |
| WO | WO-03068400 A1 | 8/2003 |
| WO | WO-2004034485 A2 | 4/2004 |
| WO | WO-2004036059 A1 | 4/2004 |
| WO | WO-2005060393 A2 | 7/2005 |
| WO | WO-2006111005 A1 | 10/2006 |
| WO | WO-2007/117212 A2 | 10/2007 |
| WO | WO-2008026713 A1 | 3/2008 |
| WO | WO-2008026714 A1 | 3/2008 |
| WO | WO-2008113180 A1 | 9/2008 |
| WO | WO-2008113182 A1 | 9/2008 |

OTHER PUBLICATIONS

"U.S. Appl. No. 12/053,374, Applicant-Initiated Interview Summary mailed Oct. 24, 2013", 3 pgs.

"U.S. Appl. No. 12/053,374, Final Office Action mailed Oct. 9, 2013", 9 pgs.

"U.S. Appl. No. 12/053,374, Non Final Office Action mailed Jun. 14, 2013", 8 pgs.

"U.S. Appl. No. 12/053,374, Notice of Allowance mailed Nov. 6, 2013", 9 pgs.

"U.S. Appl. No. 12/053,374, Response filed Jun. 6, 2013 to Final Office Action mailed Feb. 13, 2013 and Advisory Action mailed May 14, 2013", 10 pgs.

"U.S. Appl. No. 12/053,374, Response filed Sep. 16, 2013 to Non Final Office Action mailed Jun. 14, 2013", 11 pgs.

"U.S. Appl. No. 12/053,374, Response filed Oct. 30, 2013 to Final Office Action mailed Oct. 9, 2013", 10 pgs.

"U.S. Appl. No. 13/361,808, Final Office Action mailed May 31, 2013", 19 pgs.

"U.S. Appl. No. 13/361,808, Non Final Office Action mailed Feb. 13, 2014", 17 pgs.

"U.S. Appl. No. 13/361,808, Non Final Office Action mailed Jul. 2, 2014", 34 pgs.

"U.S. Appl. No. 13/361,808, Response filed May 12, 2014 to Non Final Office Action mailed Feb. 13, 2014", 16 pgs.

"U.S. Appl. No. 13/361,808, Response filed Oct. 28, 2013 to Final Office Action mailed May 31, 2013", 13 pgs.

"Canadian Application Serial No. 2,680,888, Office Action mailed Aug. 21, 2014", 4 pgs.

(56) References Cited

OTHER PUBLICATIONS

"Indian Application Serial No. 6126/DELNP/2009, Voluntary Amendment filed Mar. 23, 2011", 6 pgs.
"Japanese Application Serial No. 2009-553876, Response filed Jul. 8, 2013 to Office Action mailed Mar. 12, 2013", (w/ English Translation of Amended Claims), 9 pgs.
"Japanese Application Serial No. 2009-553876, Voluntary Amendment filed Mar. 22, 2011", (w/ English Translation of Claims), 9 pgs.
"Japanese Application Serial No. 2013-142493, Office Action mailed Jul. 10, 2014", (w/ English Translation), 6 pgs.
"Japanese Application Serial No. 2013-142493, Argument and Amendment filed Aug. 20, 2014 in response to Office Action mailed Jun. 10, 2014", (w/ English Translation of Amended Claims), 6 pgs.
"Korean Application Serial No. 10-2009-7022035, Argument and Amendment filed Jun. 13, 2014 in response to Office Action mailed Mar. 14, 2014", (w/ English Translation of Amended Claims), 21 pgs.
"Korean Application Serial No. 10-2009-7022035, Office Action mailed Mar. 14, 2014", (w/ English Office Action Summary), 10 pgs.
"Korean Application Serial No. 10-2014-7016214, Amendment filed Jul. 11, 2014", 12 pgs.
"Korean Application Serial No. 10-2014-7016214, Office Action mailed Aug. 14, 2014", (w/ English Office Action Summary), 6 pgs.
"U.S. Appl. No. 13/361,808, Final Office Action mailed Oct. 31, 2014", 14 pgs.
"U.S. Appl. No. 13/361,808, Response filed Oct. 2, 2014 to Non Final Office Action mailed Jul. 2, 2014", 19 pgs.
"European Application Serial No. 14179007.1, Partial European Search Report mailed Dec. 2, 2014", 8 pgs.
"Korean Application Serial No. 10-2014-7016214, Argument and Amendment filed Oct. 13, 2014 in response to Office Action mailed Aug. 14, 2014", (w/ English Translation of Claims), 21 pgs.
"U.S. Appl. No. 12/053,374, Response filed Sep. 13, 2011 to Restriction Requirement mailed Jun. 14, 2011", 13 pgs.
"U.S. Appl. No. 12/053,374, Final Office Action Mailed Dec. 6, 2011", 10 pgs.
"U.S. Appl. No. 12/053,374, Non Final Office Action mailed Sep. 30, 2011", 10 pgs.
"U.S. Appl. No. 12/053,374, Response filed Nov. 22, 2011 to Non Final Office Action mailed Sep. 30, 2011", 16 pgs.
"U.S. Appl. No. 12/053,374, Restriction Requirement mailed Jun. 14, 2011", 9 pgs.
"U.S. Appl. No. 12/053,408, Examiner Interview Summary mailed Oct. 24, 2011", 3 pgs.
"U.S. Appl. No. 12/053,408, Examiner Interview Summary mailed Oct. 31, 2011", 2 pgs.
"U.S. Appl. No. 12/053,408, Non Final Office Action mailed Jul. 6, 2011", 8 pgs.
"U.S. Appl. No. 12/053,408, Notice of Allowance mailed Nov. 4, 2011", 5 pgs.
"U.S. Appl. No. 12/053,408, Response filed Oct. 20, 2011 to Non Final Office Action mailed Jul. 6, 2011", 18 pgs.
"U.S. Appl. No. 12/053,408, Restriction Requirement mailed May 24, 2011", 7 pgs.
"U.S. Appl. No. 12/053,408, Response filed Jun. 23, 2011 to Restriction Requirement mailed May 24, 2011", 9 pgs.
"Chinese Application Serial No. 200880016165.0, Office Action mailed Sep. 13, 2010", 22 pgs.
"International Application Serial No. PCT/CA2006/000588, International Search Report mailed Sep. 5, 2006", 3 pgs.
"International Application Serial No. PCT/CA2006/000588, Written Opinion mailed Sep. 5, 2006", 6 pgs.
"International Application Serial No. PCT/CA2007/001129, International Search Report mailed Oct. 19, 2007", 3 pgs.
"International Application Serial No. PCT/CA2007/001129, Written Opinion mailed Oct. 19, 2007", 5 pgs.
"International Serial No. PCT/CA2008/000535, International Search Report mailed Jul. 21, 2008", 6 pgs.
"International Serial No. PCT/CA2008/000535, Written Opinion mailed Jul. 21, 2008", 5 pgs.
"International Application Serial No. PCT/CA2008/000541, International Search Report mailed Jun. 23, 2008", 3 pgs.
"International Application Serial No. PCT/US2008/000541, Written Opinion mailed Jun. 23, 2008", 6 pgs.
"Singapore Application serial No. 200906255-5 , Written Opinion and Search Report mailed Jul. 18, 2011", 17 pgs.
"Singapore Application Serial No. 200906255-5, Response filed Dec. 5, 2011 to Office Action mailed Jul. 18, 2011", 11 pgs.
Debray, A., et al., "A passive micro gas regulator for hydrogen flow control", J. Micromech. Microeng., 15, (2005), S202-S209.
McLean, G. F., et al., "Fluidic Distribution System and Related Methods", U.S. Appl. No. 12/053,408, filed Mar. 12, 2008, 35 pgs.
Schmidt, W, R., et al., "Hydrogen Storage in Polymer-dispersed Metal Hydrides (PDMH)", Proceedings of the 2001 DOE Hydrogen Program Review, (NREL/CP-470-30535), (2001), 14 pgs.
Shih, R. J, et al., "Self-supported electrodes made of $LaNi4.25Al0.15Co0.5V0.1$ and Ag or Ni hydrogenation", International Journal of Hydrogen Energy, vol. 31, (2006), 1716-1720.
Zimmermann, J., et al., "Fluidic Control System and Method of Manufacture", U.S. Appl. No. 12/053,374, filed Mar. 21, 2008, 65 pgs.
Zimmermann, J., et al., "Interface for Flexible Fluid Enclosures", U.S. Appl. No. 12/052,829, filed Mar. 21, 2008, 21 pgs.
Zimmermann, J., "Refueling Valve for a Fuel Storage System and Method Therefore", U.S. Appl. No. 11/621,542, filed Jan. 9, 2007, 27 pgs.
Zuttel, Andreas, "Materials for hydrogen storage", Materialstoday, (2003), 24-33.
"U.S. Appl. No. 12/052,829, Non-Final Office Action mailed May 12, 2010", 8 pgs.
"U.S. Appl. No. 12/052,829, Notice of Allowance mailed Dec. 16, 2010", 7 pgs.
"U.S. Appl. No. 12/052,829, Response filed Nov. 12, 2010 to Non-Final Office Action mailed May 12, 2010", 13 pgs.
"U.S. Appl. No. 12/053,366, Advisory Action mailed Oct. 18, 2010", 3 pgs.
"U.S. Appl. No. 12/053,366, Appeal Brief filed Dec. 20, 2010", 13 pgs.
"U.S. Appl. No. 12/053,366, Decision on Appeal mailed Oct. 1, 2012", 9 pgs.
"U.S. Appl. No. 12/053,366, Examiner Interview Summary mailed Jul. 8, 2010", 4 pgs.
"U.S. Appl. No. 12/053,366, Examiner's Answer to Appeal Brief Feb. 14, 2011", 17 pgs.
"U.S. Appl. No. 12/053,366, Final Office Action mailed Jul. 19, 2010", 17 pgs.
"U.S. Appl. No. 12/053,366, Non-Final Office Action mailed Dec. 14, 2009", 10 pgs.
"U.S. Appl. No. 12/053,366, Reply Brief filed Apr. 14, 2011", 3 pgs.
"U.S. Appl. No. 12/053,366, Response filed Apr. 12, 2010 to Non-Final Office Action mailed Dec. 14, 2009", 15 pgs.
"U.S. Appl. No. 12/053,366, Response filed Sep. 20, 2010 to Final Office Action mailed Jul. 19, 2010", 13 pgs.
"U.S. Appl. No. 12/053,366, Response filed Oct. 9, 2009 to Restriction Requirement mailed Sep. 9, 2009", 8 pgs.
"U.S. Appl. No. 12/053,366, Restriction Requirement mailed Sep. 9, 2009", 7 pgs.
"U.S. Appl. No. 12/053,374, Advisory Action mailed May 14, 2013", 6 pgs.
"U.S. Appl. No. 12/053,374, Examiner Interview Summary mailed May 4, 2012", 3 pgs.
"U.S. Appl. No. 12/053,374, Final Office Action mailed Feb. 13, 2013", 7 pgs.
"U.S. Appl. No. 12/053,374, Non Final Office Action mailed Nov. 6, 2012", 14 pgs.
"U.S. Appl. No. 12/053,374, Response filed Jan. 31, 2013 to Non Final Office Action mailed Nov. 6, 2012", 11 pgs.
"U.S. Appl. No. 12/053,374, Response filed May 7, 2013 to Final Office Action mailed Feb. 13, 2013", 10 pgs.
"U.S. Appl. No. 12/053,374, Response filed May 24, 2012 to Final Office Action Mailed Dec. 6, 2011", 19 pgs.
"U.S. Appl. No. 12/053,408, Supplemental response filed Oct. 25, 2011 to Non Final Office Action mailed Jul. 6, 2011".

(56) References Cited

OTHER PUBLICATIONS

"U.S. Appl. No. 13/361,808, Examiner Interview Summary mailed May 9, 2013", 3 pgs.

"U.S. Appl. No. 13/361,808, Non Final Office Action mailed Oct. 4, 2012", 14 pgs.

"U.S. Appl. No. 13/361,808, Response filed Mar. 4, 2013 to Non Final Office Action mailed Oct. 4, 2012", 10 pgs.

"Chinese Application Serial No. 200880016919.2, Office Action mailed Jan. 19, 2012", 3 pgs.

"Chinese Application Serial No. 200880016919.2, Office Action mailed Dec. 17, 2010", (w/ English Translation), 11 pgs.

"Chinese Application Serial No. 200880016919.2, Office Action Mailed Aug. 20, 2012", 3 pgs.

"Chinese Application Serial No. 200880016919.2, Response filed Mar. 31, 2012 to Office Action mailed Jan. 19, 2012", (w/ English Translation of Amended Claims), 13 pgs.

"Chinese Application Serial No. 200880016919.2, Response filed May 3, 2011 to Office Action mailed Dec. 17, 2010", (w/ English Translation of Claims), 34 pgs.

"Chinese Application Serial No. 200880016919.2, Response filed Nov. 5, 2012 to Office Action mailed Aug. 20, 2012", w/English claims, 14 pgs.

"European Application Serial No. 08733645.9 , Extended European Search mailed Jul. 21, 2011", 9 pgs.

"European Application Serial No. 08733645.9 , Response filed Feb. 9, 2012 to Extended European Search mailed Jul. 21, 2011", 12 pgs.

"European Application Serial No. 08733645.9, Office Action mailed Apr. 12, 2012", 6 pgs.

"European Application Serial No. 08733645.9, Response filed Dec. 13, 2012 to Office Action mailed Apr. 12, 12", 12 pgs.

"International Application Serial No. PCT/CA2008/000541, International Preliminary Report on Patentability mailed Oct. 1, 2009", 8 pgs.

"International Application Serial No. PCT/CA2008/000541, International Search Report mailed Jun. 23, 2008", 6 pgs.

"International Application Serial No. PCT/CA2008/000541, Written Opinion mailed Jun. 23, 2008", 6 pgs.

"Japanese Application Serial No. 2009-553876, Office Action mailed Mar. 12, 2013", 21 pgs.

"Korean Application Serial No. 10-2009-7022035, Voluntary Amendment filed Mar. 26, 2013", 11 pgs.

"Singapore Application Serial No. 200906222-5, Response Filed Sep. 12, 2011 to Office Action mailed Apr. 12, 2011", 4 pgs.

"Singapore Application Serial No. 200906222-5, Search Report and Written Opnion nailed Apr. 12, 2011", 15 pgs.

"Chinese Application Serial No. 201310118738.3, Office Action mailed Nov. 18, 2014", 22 pgs.

\* cited by examiner

US 9,118,042 B2

FLUIDIC DISTRIBUTION SYSTEM AND RELATED METHODS

This application is a continuation application of U.S. patent application Ser. No. 12/053,408, filed Mar. 21, 2008, which application claims the benefit of priority under 35 U.S.C. §119(e) to U.S. Provisional Patent Application Ser. No. 60/919,470, filed Mar. 21, 2007, which applications are hereby incorporated by reference in their entirety.

BACKGROUND

Electronic components, such as electronic devices, are trending to become smaller in size while increasing in performance technology. Other applications facilitating electrochemical cell power supplies demand high output or high efficiency. As electronic components are designed smaller in size, incorporate sophisticated and complex technology, require high power density and high level of control and efficiency, the demands on the associated power supply become greater. Further, the additional technology may require that the power supply last for longer periods of time or that power be delivered at uniform rates for steady electronic component performance.

One example of a power supply is a fuel cell system. A fuel cell system may include one or multiple fuel cell layers, each layer comprising anodes, cathodes, and an electrolyte membrane interposed between the anodes and cathodes. A fuel cell system which includes such a cellular layer typically includes a means for supplying air to the cathodes and a means for supply or fuel or other reactant fluid to the anodes at an acceptable pressure level.

In many electrochemical cell systems, such as fuel cell systems, reactant plenums include a flow distribution network, or flow field, to direct the flow of fuel across the electrochemical cell layer. This adds complexity, cost and volume to the design. However, with a single inlet the size of the electrochemical cell layer that can be serviced without a flow field is very limited, since the need to uniformly distribute fuel to the fuel absorbing anodes requires non-uniform flow profiles within the cavity. Such non-uniform flow profiles have negative effect on fuel cell operation. In particular, this sets up gradients of water flux and heat transfer within the electrochemical cell layer leading to uneven power production, and hence degraded performance and lifetime.

SUMMARY

Embodiments of the present invention relate to a fluid distribution system. The system may include one or more electrochemical cell layers, a bulk distribution manifold having an inlet, a cell layer feeding manifold in direct fluidic contact with the electrochemical cell layer and a separation layer that separates the bulk distribution manifold from the cell feeding manifold, providing at least two independent paths for fluid to flow from the bulk distribution manifold to the cell feeding manifold.

BRIEF DESCRIPTION OF THE DRAWINGS

In the drawings, like numerals describe similar components throughout the several views. The drawings illustrate generally, by way of example, but not by way of limitation, various embodiments discussed in this patent document.

DETAILED DESCRIPTION

Figure 1:
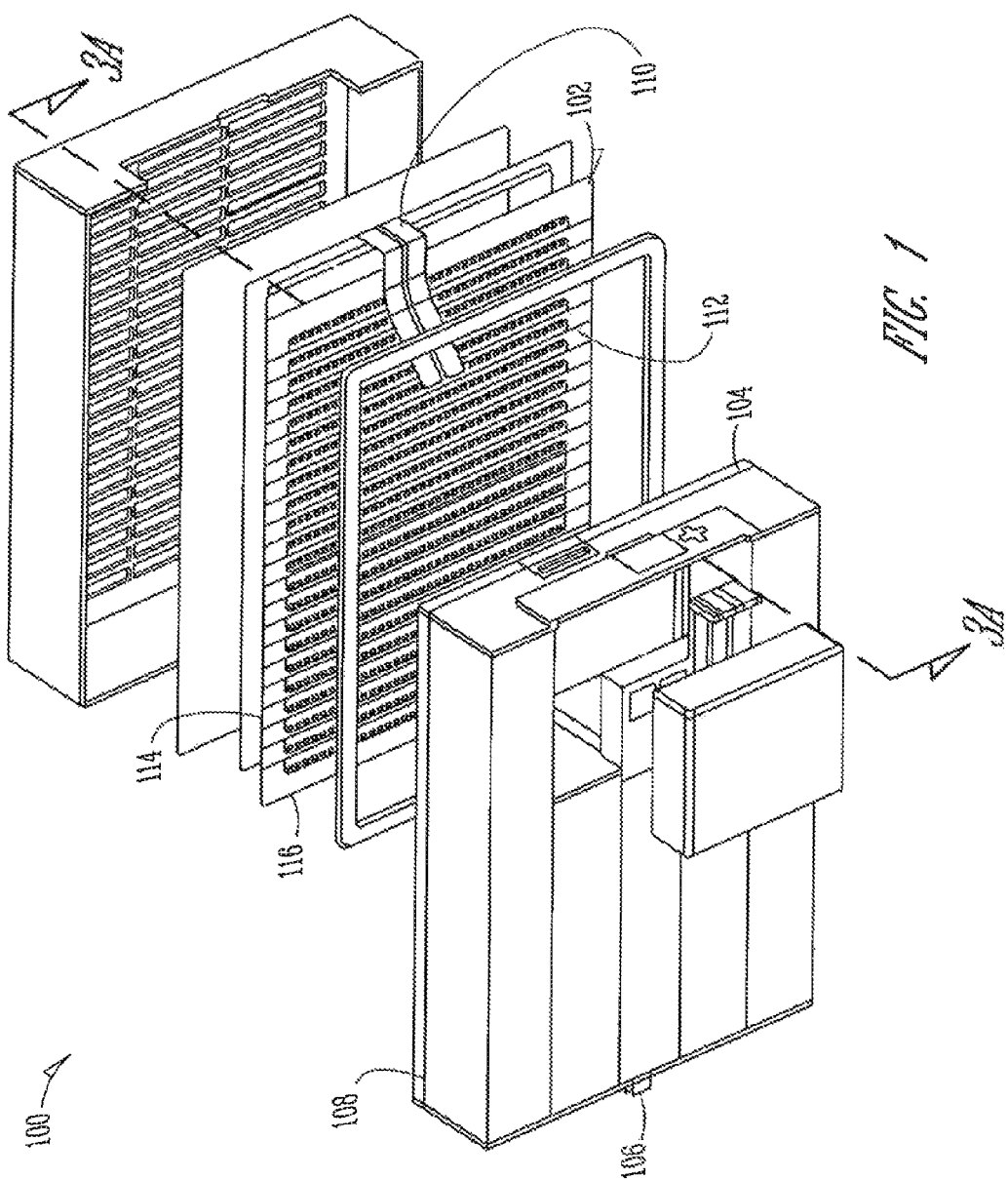
FIG. 1 illustrates an exploded view of an electrochemical cell system, as constructed in accordance with at least one embodiment.

The following Detailed Description includes references to the accompanying drawings, which form a part of the Detailed Description. The drawings show, by way of illustration, specific embodiments in which the present systems, assemblies, and methods may be practiced. These embodiments, which are also referred to herein as "examples," are described in enough detail to enable those skilled in the art to practice the present systems, assemblies, and methods. The embodiments may be combined, other embodiments may be utilized or structural or logical changes may be made without departing from the scope of the present systems, assemblies, and methods. The following Detailed Description is, therefore, not to be taken in a limiting sense and the scope of the present systems, assemblies, and methods are defined by the appended claims and their legal equivalents.

In this document, the terms "a" or "an" are used to include one or more than one, the term "or" is used to refer to a nonexclusive "or" unless otherwise indicated, and the phrase "electrical component(s)" is used to include portable electronic devices, such as but not limited to, cellular phones, satellite phones, laptop computers, computer accessories, displays, personal audio or video players, medical devices, televisions, transmitters, receivers, lighting devices including outdoor lighting or flashlights, electronic toys, or any device conventionally used with batteries. Additionally, it is to be understood that the phraseology or terminology employed herein, and not otherwise defined, is for the purpose of description only and not of limitation. Furthermore, all patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

Embodiments of the invention relate to a fluidic apparatus that be can be integrated in a variety of architectures to dynamically adjust conditions along the surface of an electrochemical cell layer to provide high-performance conditions unique to localized regions of the cell layer. The electrochemical cell layer may be a fuel cell layer, for example. The apparatus or distribution system may be operable with other devices of the electrochemical cell system to protect a cell layer from potentially destructive or non-efficient fluid conditions by stabilizing a reactant flow in response to a local fluid condition prior to exposing the cell layer, mitigate catastrophic failure of entire cell assemblies during failure events of individual cells, and operate to optimize fluid flow conditions of the cell assembly responsive to modes of operation of the overall system.

Various fluid systems can be integrated within the electrochemical cell system to deliver reactants for the reaction and remove products. Stacked electrochemical layer assemblies include multiple electrochemical cell units and alternating fluid delivery layers for providing reactant to reaction sites along a surface of each electrochemical cell unit. Planar array architectures receive reactants from a surface of a common electrochemical cell layer for multiple cells in the array and similarly remove product from the opposing surface of the electrochemical layer. Arrays may be flexible and have conformal architectures to any suitable surface. Other geometric architectures include enclosed reactant plenums such as tubular-shaped plenums formed completely or in part by the electrochemical cell layer that can receive fluid for the fuel cells.

A fluid distribution system or device including optional fluidic controllers, and related systems and methods are provided herein. Fluidic controllers may include pressure regulator components, flow controllers, on/off valves, flow restrictors, pressure drop materials, ports, inlets, outlets, combinations thereof, or any device capable of affecting one or more properties of a fluid in a fuel cell system, such as flow rate or pressure. As one example, use of the device allows for the dimensions of a single fuel cell layer to be increased or the dimensions of the fuel cell system otherwise changed arbitrarily without resulting in a non-uniform fuel flow to the anodes of the cellular layer. As another example, the fluidic device allows for uniform concentration gradients along reactant into and through the reactant plenum of an anode or cathode surface of an electrochemical cell layer without requiring the use of explicit flowfield plates, thereby reducing the overall size and potentially the cost of the fuel cell system. As yet another example, the array of fluidic controllers allows for localized control of fuel or other fluid pressure applied to localized regions and may include a layered structure providing relatively easy, economically feasible, and volumetric-friendly fuel cell system manufacture

DEFINITIONS

As used herein, "fluidic controller" refers to any device capable of affecting one or more properties of a fluid in a fuel cell system, such as flow rate or pressure. Examples of fluidic controllers include pressure regulator components, flow controllers, on/off valves, flow restrictors, pressure drop materials or combinations thereof.

As used herein, "electrochemical layer" refers to a sheet including one or more active functional members of an electrochemical cell. For example, an electrochemical layer may include a fuel cell layer. As used herein, "active functional members" refers to components of an electrochemical cell that function to convert chemical energy to electrical energy or convert electrical energy to chemical energy. Active functional members exhibit ion-conductivity, electrical conductivity, or both.

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention including without limitation proton exchange membrane fuel cells (PEMFCs), solid oxide fuel cells (SOFCs), molten carbonate fuel cell (MCFCs), alkaline fuel cells, other suitable fuel cells, and materials thereof. Further examples of fuel cells include proton exchange membrane fuel cells, direct methanol fuel cells, alkaline fuel cells, phosphoric acid fuel cells, molten carbonate fuel cells or solid oxide fuel cells.

An electrochemical cell layer, such as a fuel cell layer, may include one or more anodes, cathodes, and electrolyte interposed between the anodes and cathodes. In a fuel cell system, the cathodes may be supplied with air containing oxygen for use as an oxidizing agent, and the anodes may be supplied with hydrogen, for example, for use as fuel. The oxidizing agent may be supplied from air surrounding the fuel cell system, while the fuel or other reactant fluid may be supplied from the fluid reservoir.

Arrays of unit cells can be constructed to provide varied-power generating electrochemical cell layers in which the entire electrochemical structure is contained within the layer. This means additional components such as plates for collecting currents etc. can be eliminated, or replaced with structures serving different functions. Structures like those described herein are well adapted to be manufactured by continuous processes. Such structures can be designed in a way which does not require the mechanical assembly of individual parts. In some embodiments, the conductive path lengths within this structure may be kept extremely short so that ohmic losses in the catalyst layer are minimized. Array may refer to a plurality of individual unit cells. The plurality of cells may be formed on a sheet of ion exchange membrane material, a substrate, or may be formed by assembling a number of components in a particular manner.

Unit cells according to the invention may be used in a planar electrochemical cell layer that is conformable to other geometries, as described in application Ser. No. 11/185,755, filed on 21 Jul. 2004, entitled "DEVICES POWERED BY CONFORMABLE FUEL CELLS" and application Ser. No. 60/975,132, filed 25 Sep. 2007, entitled "FLEXIBLE FUEL CELL," which are hereby incorporated by reference.

Arrays can be formed to any suitable geometry. Examples of planar arrays of fuel cells are described in co-owned U.S. application Ser. No. 11/047,560 filed on 2 Feb. 2005 entitled "ELECTROCHEMICAL CELLS HAVING CURRENT CARRYING STRUCTURES UNDERLYING ELECTROCHEMICAL REACTION LAYERS", the disclosure of which is herein incorporated by reference. Fuel cells in an array can also follow other planar surfaces, such as tubes as found in cylindrical fuel cells. Alternately or in addition, the array can include flexible materials that can be conformed to other geometries.

As used herein, "fluid" refers to a continuous, amorphous substance whose molecules move freely past one another and that has the tendency to assume the shape of its container. A fluid may be a gas, liquefied gas, liquid or liquid under pressure. Examples of fluids may include fluid reactants, fuels, oxidants, and heat transfer fluids. Fluid fuels used in fuel cells may include hydrogen gas or liquid and hydrogen carriers in any suitable fluid form. Examples of fluids include air, oxygen, water, hydrogen, alcohols such as methanol and ethanol, ammonia and ammonia derivatives such as amines and hydrazine, silanes such as disilane, disilabutane, complex metal hydride compounds such as aluminum borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane, butane, borohydride compounds such as sodium and potassium borohydrides, and formic acid.

As used herein, "fluid enclosure" may refer to a device for storing a fluid. The fluid enclosure may store a fluid physically or chemically. For example, the fluid enclosure may chemically store a fluid in active material particles. A fluid enclosure may also refer to a fluid enclosure including active material particles and an outer enclosure wall, conformably coupled to the fluid storage component and may also include structural fillers. Examples of such a fluid enclosure are found in commonly-owned U.S. patent application Ser. No. 11/473,591, filed Jun. 23, 2006, whose disclosure is incorporated by reference herein in its entirety.

As used herein, "active material particles" refer to material particles capable of storing hydrogen or other fluids or to material particles that may occlude and desorb hydrogen or another fluid. Active material particles may include fluid storing materials that occlude fluid, such as hydrogen, by chemisorption, physisorption or a combination thereof. Some hydrogen-storing materials desorb hydrogen in response to stimuli, such as change in temperature, change in heat or a change in pressure. Examples of hydrogen-storing materials that release hydrogen in response to stimuli, include metal hydrides, chemical hydrides, suitable micro-ceramics, nano-ceramics, boron nitride nanotubes, metal organic frameworks, palladium-containing materials, zeolites, silicas, aluminas, graphite, and carbon-based reversible fluid-storing materials such as suitable carbon nanotubes, carbon fibers, carbon aerogels, and activated carbon, nano-structured carbons or any combination thereof. The particles may also include a metal, a metal alloy, a metal compound capable of forming a metal hydride when in contact with hydrogen, alloys thereof or combinations thereof. The active material particles may include magnesium, lithium, aluminum, calcium, boron, carbon, silicon, transition metals, lanthanides, intermetallic compounds, solid solutions thereof, or combinations thereof.

As used herein, "metal hydrides" may include a metal, metal alloy or metal compound capable of forming a metal hydride when in contact with hydrogen. Metal hydride compounds can be generally represented as follows: $AB$, $AB_2$, $A_2B$, $AB_5$ and BCC, respectively. When bound with hydrogen, these compounds form metal hydride complexes.

As used herein, "composite hydrogen storage material" refers to active material particles mixed with a binder, wherein the binder immobilizes the active material particles sufficient to maintain relative spatial relationships between the active material particles.

As used herein, "occlude" or "occluding" or "occlusion" refers to absorbing or adsorbing and retaining a substance, such as a fluid. Hydrogen may be a fluid occluded, for example. The fluid may be occluded chemically or physically, such as by chemisorption or physisorption, for example.

As used herein, "desorb" or "desorbing" or "desorption" refers to the removal of an absorbed or adsorbed substance. Hydrogen may be removed from active material particles, for example. The hydrogen or other fluid may be bound physically or chemically, for example.

As used herein, "contacting" refers to physically, chemically, electrically touching or within sufficiently close proximity. A fluid may contact an enclosure, in which the fluid is physically forced inside the enclosure, for example.

Embodiments of the present invention relate to a fluid distribution system. The system may include one or more electrochemical cell layers, each layer having a first side and a second side and each layer having one or more electrochemical cells, a bulk distribution manifold having an inlet, a cell layer feeding manifold in direct fluidic contact with the electrochemical cell layer and a separation layer that separates the bulk distribution manifold from the cell feeding manifold, providing at least two independent paths for fluid to flow from the bulk distribution manifold to the cell feeding manifold. The bulk manifold may further include an outlet. The fluid distribution system may also include a primary pressure regulator coupled to the inlet of the bulk distribution manifold.

The fluid distribution manifold may be a layered structure, for example. One or more components of the system may be features formed by one or more of the processes of etching, stamping, laser cutting, die cutting, deposition, printing, machining, molding, or electroforming a feature on the one or more featured layers. The featured layers may be sealed by one or more of gluing, adhesive bonding, thermal bonding, diffusion boding, welding, soldering the featured layers together or combinations thereof, for example.

The system may include one or more fluidic controllers in contact with the at least two independent paths. The fluidic controllers may be pressure regulator components, flow controllers, on/off valves, flow restrictors, pressure drop materials or combinations thereof. Each controller may include two or more featured layers, each layer including an array of features associated therewith. The features from a first featured layer may be interactively associated with features from a second featured layer. The one or more fluidic controllers may co-planar with one another. Co-planar may include being positioned on the same side of layer on integrated within the same layer. The layer itself may be bent or shaped in any number of configurations, such as a cylinder. The fluidic controllers may act independently of one another.

The fluid distribution system may also include a primary pressure regulator coupled to the inlet of the bulk distribution manifold, wherein the one or more fluidic controllers include secondary pressure regulator components and wherein the primary pressure regulator component and the secondary pressure regulator component operate at different pressures.

The at least two independent paths may be spatially distributed within the separation layer. Spatially distributed may include any number of patterns or configurations. A fluid enclosure may be coupled to the bulk distribution manifold. The bulk distribution manifold may include a segmented manifold configured to direct fluid to the at least two independent paths. The cell feeding manifold may include at least two discrete regions, each region served by at least one fluidic controller. The cell feeding manifold may be in direct fluidic contact with an anode side or cathode side of the one or more electrochemical cell layers.

Embodiments of the invention also relate to an electrochemical cell system, including one or more electrochemical cell layers, each layer having a first side and a second side and each layer having one or more electrochemical cells, one or more fluid plenums fluidically coupled to a first side of the one or more fuel cell layers and two or more fluidic controllers coupled to at least one of the one or more fluid plenums. The one or more electrochemical cell layers may be fuel cell layers. The one or more fluid plenums may include at least two reactant plenums, each of the reactant plenums associated with one or more of the fluidic controllers. In addition, each of the reactant plenums may be associated with a single fluidic controller. Alternatively, each of the reactant plenums may be associated with one or more electrochemical cell units of the electrochemical cell layers. The fluid plenums may be fuel plenums, for example. A fuel in contact with the fuel plenums may include hydrogen. The fuel may also include alcohols, amines, silanes, complex metal hydride compounds, boranes, hydrocarbons, carbazoles, saturated cyclic and polycyclic hydrocarbons, saturated amino boranes or combinations thereof.

At least two of the two or more fluidic controllers may be fluidically coupled to a common fluid manifold. The one or more electrochemical cell layers may include at least two electrochemical cell sets, each electrochemical cell set including at least two electrically serially-coupled electrochemical cell units, wherein the at least two electrochemical cell sets are arranged in an electrically serial configuration, an electrically parallel configuration, or a combination thereof.

As discussed above, the fluidic controllers may be used with, among other things, a fuel cell system 100, such as the fuel cell system illustrated in FIG. 1. In this example, the fuel cell system 100 includes, but is not limited to, one or more of a fuel cell layer 102, fluidic controllers 104, a charge port or inlet 106, a fluid reservoir 108, or a current collecting circuit 110. In one example, the fluid reservoir 108 is filled with fuel by pressurizing the charge port or inlet 106. In another example, power from the fuel cell layer 102 is utilized by the current collecting circuit 110, which collects the power from the fuel cell layer 102 and routes it out of the fuel cell system 100.

Figure 2:
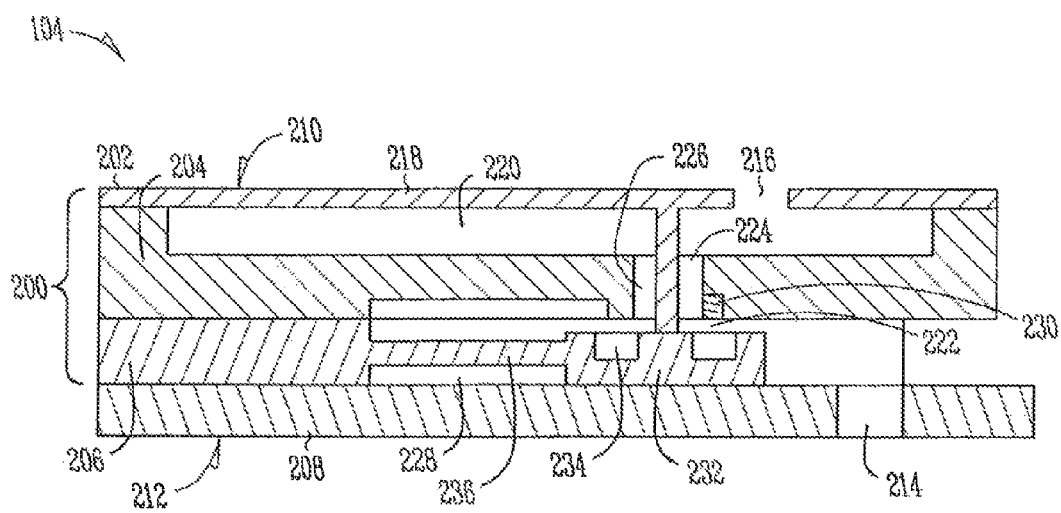
FIG. 2 illustrates a cross-sectional view of a fluidic controller in an open-valve state, as constructed in accordance with at least one embodiment.

FIG. 2 illustrates a cross-sectional view of one example of a fluidic controller 104, an array of which may be used to reduce the primary fluidic pressure emanating from the fluid reservoir 108 to the second fluidic pressure used by a surface of the fuel cell layer. The fluidic controllers 104 include inlets to communicate fuel reservoir and the fuel cell layer at localized regions within a reactant plenum.

Figure 3A:
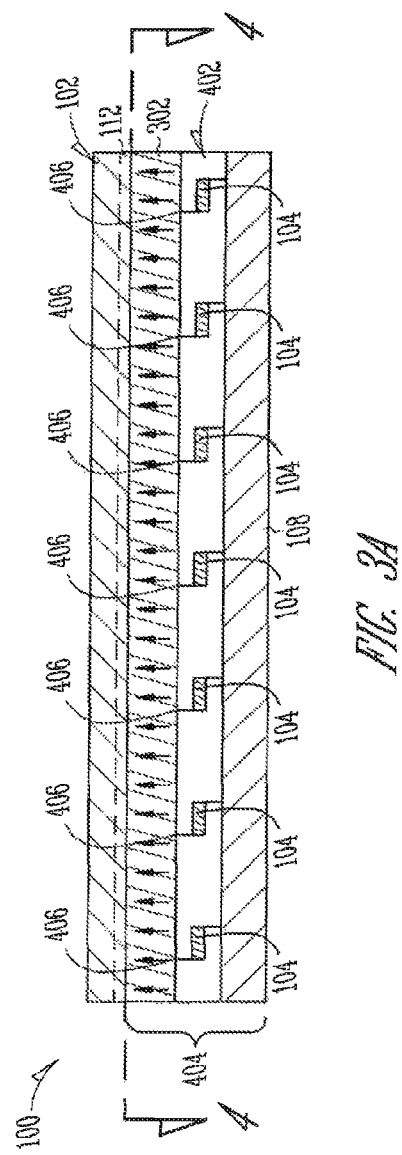
FIG. 3A illustrates a cross-sectional view of portions of an electrochemical cell system, such as along line 3A-3A of FIG. 1, and an associated uniform fuel flow, as constructed in accordance with at least one embodiment.
Figure 3B:
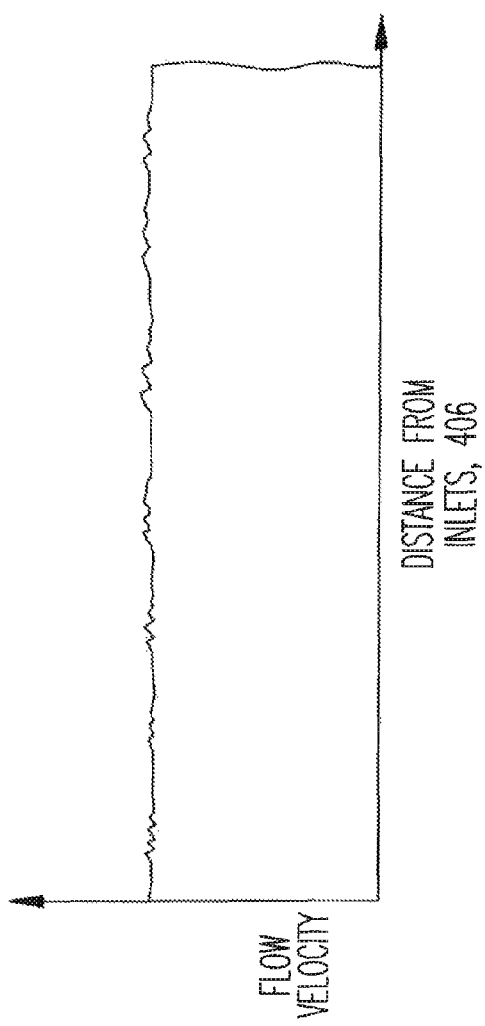
FIG. 3B illustrates a conceptualization of uniform fuel flow velocity present within the electrochemical cell system of FIG. 3A, which includes an array of fluidic controllers and an array of anode cavity inlets, as constructed in accordance with at least one embodiment.

Fluid manifolds for fuel cells having stacked architectures may include external or internal manifolding along the stack to deliver fluid to an inlet of each flow field. The flow controllers include a high-pressure inlet and two or more outlets in fluid communication with localized regions of the recant plenum and arranged along a surface of a fuel cell layer. Instead of relying on a single inlet for delivering reactant to the cell layer, a fluidic device can be used to provide active and variable control of independent reactant flows in response to local conditions along the surface of the fuel cell layer, as shown in FIGS. 3A-3B. Reactant delivery can be facilitated on-demand responsive to the localized conditions along the cell layer. The fluid device delivers stoichiometric reactant flows to unit cells or groups of localized unit cells—even along lower surface areas, this allows localized cells to consume reactant according to their capability.

Referring again to FIG. 3A, each of the fluidic controllers 104 in the array 402 serves to control the flow of fuel or other fluid from the bulk flow manifold 108 to the fuel plenum 302. If control of the flow is based on maintaining uniform pressure in the fuel plenum 302, then each pressure regulator may act independently of one another to maintain such uniform pressure. In one such example, the fluidic controllers 104 are actuated electronically, such as by way of a feedback mechanism, in which case parts of the electrochemical cell layer may turned on and off as desired. In this way, long standby time operation of the electrochemical cell system 100 may be achieved.

As shown in FIG. 3B, when multiple inlets 406 to the surface of the electrochemical cell layer from the low pressure outlets 216 of the array 402 of fluidic controllers 104 are employed, such as in a parallel configuration, there is advantageously a fluid (e.g., fuel) flow velocity that is uniform or nearly uniform along a length and width of the fuel cell layer 102.

Figure 4:
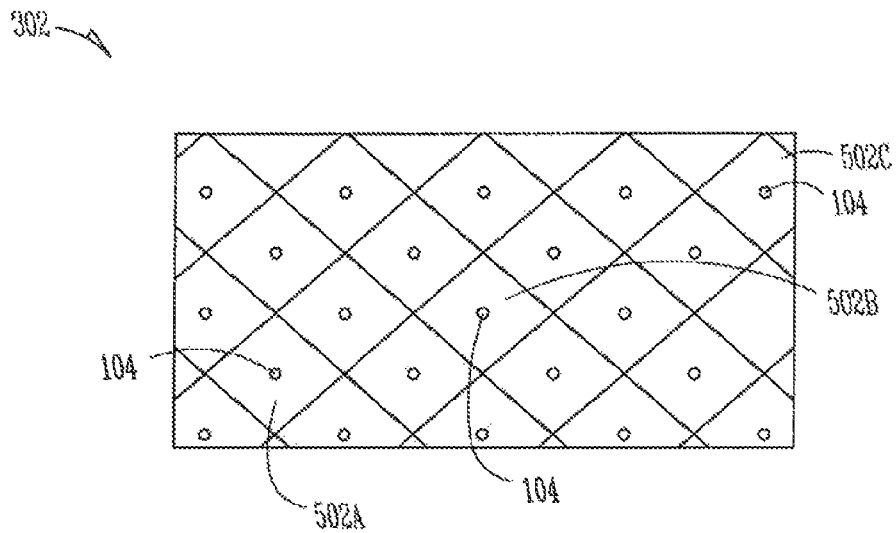
FIG. 4 illustrates a cross-sectional view of a low pressure system plenum of a fuel cell system, such as along line 4-4 of FIG. 3A.

As shown in FIG. 4, the fluidic controllers 104 may be spatially distributed so that each fluidic controller distributes fuel or other fluid into localized regions of the fuel plenum 302. The fuel plenum 302 may be an anode cavity. Optionally, the fuel plenum 302 could be partitioned into a number of discrete regions 502A, 502B, 502C, etc. as shown, with each region served by one or more fluidic controllers 104. Alternatively, the fuel plenum 302 could be a single plenum with multiple inlets 406.

In operation, fuel or other fluid is allowed to enter the fluid device via a charge port or inlet 106. As shown in cross-section in the example of FIG. 3A, a dual control system, is shown including an electrochemical cell layer having a reactant plenum separated from a bulk flow manifold 108 by the array of fluid controllers. In one example, the dual system plenum 404 has approximately the same dimensions as the fuel cell layer 102, with the electrochemical cell layer 102 in direct fluidic communication with the cell layer surface. The reservoir 108 may be a fluid plenum, such as a bulk distribution plenum.

The electrochemical cell system may include one or more electrochemical cell layers, a reactant plenum fluidically coupled to the one or more electrochemical cell layers, a bulk flow manifold and one or more arrays of fluidic controllers coupled to the reactant plenum. One or more inlet fluidic controllers may be coupled to the bulk flow manifold. Two or more outlet controllers may be positioned between the bulk flow manifold and the reactant plenum. Optionally, there may be a fluidic controller or other fluid control element at such inlet. Fluidic controllers 104 may control the fluidic (e.g., fuel) pressure coming out of the fluid reservoir 108 by reducing a primary (higher) fluidic pressure present in the fluid reservoir 108 to a more constant secondary (lower) fluidic pressure for delivery to the electrochemical cell layer 102, and more specifically, the anodes 112. The fluidic controllers 104 may also control other properties of a fluid or the fluid distribution system, such as flow rate, pressure, volume, etc.

Figure 5:
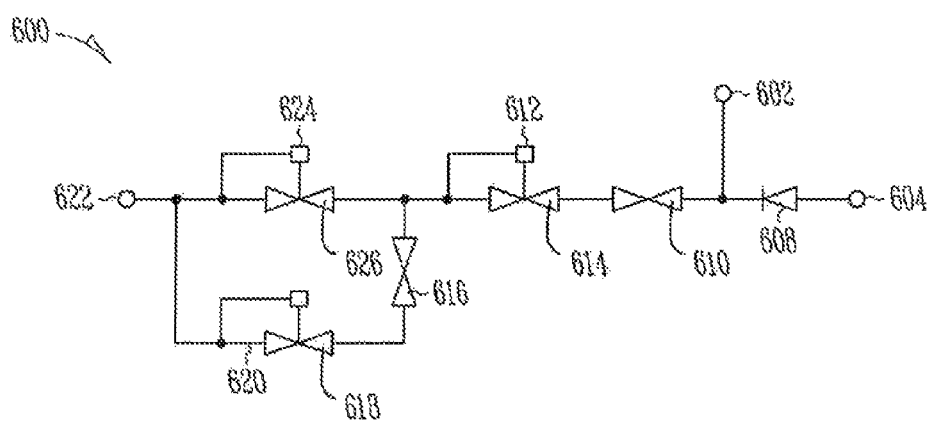
FIG. 5 illustrates a system layout of a fluidic control system with at least one embodiment.

Referring to FIG. 5, a system layout 600 of a fluid control system is illustrated. In an option, the fluidic control system includes one or more of a fuel refueling inlet 604, a check valve component 608, a pressure selection valve 616, an on/off valve 610, and/or an outlet 622, for example, to a fuel cell. The on/off valve 610 turns off the fuel supply if the electrochemical cell system is turned off. The fuel system further optionally includes a connection 602 to a fuel reservoir.

The fluidic control system optionally includes at least one fluidic controller, such as a pressure regulator component 612, 620, 624. In an example, the at least one pressure regulator component 612, 620, 624 includes at least one primary pressure regulator component 614. In a further option, the at least one pressure regulator component 612, 620, 624 includes at least one primary pressure regulator component 614 and/or at least one secondary pressure regulator component 618, 626. In an option, the fluidic control system, includes multiple pressure regulator components 612, 620, 624 such as multiple secondary pressure regulator components 618, 626, or an array of secondary pressure regulator components 618, 626 alone or in combination with the primary pressure regulator component.

When the electrochemical cell fed by the system is able to tolerate wide variations in inlet pressure, or when the difference between the fluid storage pressure, such as fuel storage pressure, and the demanded delivery pressure is low, a primary pressure regulator component, such as a single, primary pressure regulator component, may be used. When the electrochemical cell fed by the system is unable to tolerate wide variations in pressure, the system can be configured with both primary and secondary regulators.

The primary pressure regulator component 614 steps the pressure down for the secondary pressure regulator component 618, 626. Further, the primary pressure regulator component 614 reduces the effect of fluctuating fuel reservoir pressure on the output of the secondary pressure regulator components 618, 626. The primary pressure regulator component 614 and the secondary pressure regulator component 618, 626, and/or the two or more secondary pressure regulator components 618, 626 can be set to different output pressures. In this configuration, one of the regulators can provide a lower pressure for when the electrochemical cell is in standby operation, while another can provide a higher pressure when the electrochemical cell is actively operating. This option can be extended to include multiple pressures tuned to support a wide range of operating modes of the electrochemical cells, including the modulation of pressures for ancillary electrochemical cell management functions such as gas purging, water management etc. Using multiple secondary pressure regulator components allows for digital selection of the operating pressures, and eliminates a need for a continuously variable pressure regulation system.

In an option, the pressure selection valve 616 controls flow to the higher pressure secondary regulator 618, 626 and controls the pressure of the linked output of the multiple secondary regulators 618, 626. If the pressure selection valve 616 is off, the output of the secondary pressure regulator components 618, 626 is at the lower pressure, while if the valve 616 is open, the output will be at the higher pressure. In an option, one or both of the secondary regulators 618, 626 are pilot pressure controlled from the fuel pressure at the electrochemical cell. This allows for the fuel pressure at the electrochemical cell to remain constant, unaffected by pressure losses in the fuel conduits between the regulators 612, 620, 624 and the electrochemical cell.

As mentioned above, two or more secondary regulators 618 can be included in the fluidic control system. For example, an array of parallel secondary regulators 618 with each having its own pressure selection valve would enable digital pressure control where the pressure can be increased and decreased in increments. The regulators 618 in the array would each have differing output pressure.

The electrochemical cell pressure is easily fed back through the conduit back to the physical location of the pressure regulator components. Additionally, the unregulated gas pressure can be used to provide mechanical power into the system for actuation of valves due to the multiple stages. This allows for the system to operate with a minimum of external energy inputs.

Advantageously, this invention allows for high fuel or other fluid pressures, such as pressures exceeding 30 psi, to exist in the fluid reservoir 108 as these high pressures are never allowed to exert a force on the surface of the electrochemical cell layer 102 due to the array of fluidic controllers 104. This means an overall high pressure bulk fuel distribution system may be employed, allowing for easy circulation of fuel or other fluid within the fluid reservoir 108 and avoiding the possibility of having local starvation of fuel or other powering fluid. Optionally, multiple high pressure fluid reservoirs may be connected to a common inlet so that multiple electrochemical cell layers can be operated as a single system. This allows each electrochemical cell layer to be individually pressure regulated, eliminating the need for pressure distribution management and allowing for an alternative method of constructing multiple electrochemical cell layer assemblies.

The one or more electrochemical cell layers may include a plurality of electrochemical cells electrically serially-coupled to form electrochemical cell sets. Each may include a first plurality of electrochemical cell sets that are electrically coupled to form a first group of parallel-coupled electrochemical cell sets, a second plurality of electrochemical cell sets that are electrically coupled to form a second group of parallel-coupled electrochemical cell sets. The first group may be electrically serially-coupled to the second group. The sets may be fuel cell sets, for example.

The fluid device can be operated to reduce flow to localized regions of the reactant plenum proximal to failed cell units or cell sets. An unusually large consumption rate of the electrochemical cell (i.e. a compromised or ruptured electrolyte) may trigger a valve in fluid communication with the localized area to shut off. Blocking diodes between any parallel cell units or sets would prevent reverse currents flowing through them.

A fluid is often provided from a fluid enclosure at pressures in excess of those tolerable by an electrochemical cell layer. A high pressure bulk distribution system may be employed, allowing for easier circulation of fuel or other fluid with a fluid reservoir or plenum and avoids the possibility of having local starvation of fuel or other powering fluid. Optionally, multiple high pressure fluid reservoirs may be connected to a common inlet so that multiple fuel cell layers can be operated as a single system. Each electrochemical cell layer may then be individually regulated, such as pressure regulated, eliminating the need for pressure distribution management and allowing for an alternative method of constructing multiple electrochemical cell assemblies.

In the example of FIG. 2, the fluidic controller 104 includes a layered structure having one or more featured layers 200. The featured layers 200 each include features thereon or therein. The features provide one or more portions of the fluidic controller 104. When the featured layers 200 are disposed adjacent to one another, features on one layer are brought together with features of another layer; for example, the features are brought physically or functionally together. When the features from different layers 200 are brought together, the fluidic controller 104 may be formed. The first featured layer and the second featured layer may be brought together by stacking, for example.

As shown in FIG. 2, the one or more featured layers 200 may include, but are not limited to, a first layer 202, a second layer 204, a third layer 206, and a fourth layer 208. In this example, the second layer 204 is disposed between the first layer 202 and the third layer 206, and the third layer 206 is disposed between the second layer 204 and the fourth layer 208. The featured layers 200 may be combined in such a way that the fluidic controller 104 is defined, in part, by a first side 210 and a second side 212. In one example, the first layer 202 forms the first side 210 and includes a low pressure outlet 216, while the fourth layer 208 forms the second side 212 and includes a high pressure inlet 214. The first side 210 and the second side 212 may be configured to cooperatively interact with adjacent components of the electrochemical cell system 100 (FIG. 1), such as an anode cavity disposed between the fluid reservoir 108 (FIG. 1) and the electrochemical cell layer 102 (FIG. 1) and the fluid reservoir 108 (FIG. 1), respectively. Notably, fewer or more than four layers may be used to create the fluidic controller 104, the layers may be formed of relatively thin sheets of material, and multiple fluidic controllers 104 may be formed on the same layers, resulting in an array of co-planar or substantially co-planar regulators (see FIG. 3A).

Referring again to the first layer 202, it can serve a number of functions, and may include a number of features thereon. In one example, the first layer 202 provides a cap 218 to a low pressure regulator plenum 220, where the low pressure regulator plenum 220 is formed between the first layer 202 and the second layer 204. In various examples, the first layer 202 includes an elastically deformable material, and further may actuate a regulator valve 222 through an actuation member 224 via the elastically deformable material. The first layer 202 may further provide an elastic spring force to counteract the force from pressure in the low pressure regulator plenum 220. In one example, the elastic stiffness of the first layer 202 determines the output pressure of the fluidic controller 104. The actuation member 224, in this example, is disposed through an opening 226 of the second layer 204.

As shown, the actuation member 224 provides a contact between the regulator valve 222 and the elastically deformable material of the first layer 202. In one example, the actuation member 224 includes a member that is disposed between the regulator valve 222 and the first layer 202. In another example, the actuation member 224 is formed on or as part of the first layer 202. In another example, the actuation member 224 may be formed integrally or as part of the third layer 206. In yet another example, the actuation member 224 includes a sphere or a ball disposed between the first layer 202 and the regulator valve 222. When pressure in the low pressure regulator plenum 220 drops below the desired output pressure of the fluidic controller 104, the elastic material of the first layer 202 presses against the actuation member 224 causing the regulator valve 222 to open.

Referring to the second layer 204, it may include a number of features such a portion of the low pressure regulator plenum 220, and separates the low pressure regulator plenum 220 from a high pressure regulator plenum 228. In another example, the second layer 204 further provides a sealing seat 230 for the regulator valve 222. The third layer 206 may define a portion of the high pressure regulator plenum 228, in further cooperation with the second layer 204 and the fourth layer 208. In this example, the third layer 206 further includes the regulator valve 222.

The regulator valve 222 seals the opening 226 within the fluidic controller 104. In one example, the regulator valve 222 is formed with the third layer 206, such that the regulator valve 222 is integral with the third layer 206 without the need for additional, discrete components. In another example, the regulator valve 222 formed with the third layer 206 may also serve as the actuation member 224. In a further example, the regulator valve 222 includes a valve body 232, a valve seal 234, and a valve spring member 236. The valve body 232 may have the valve seal 234 therein, for example, via molding. The valve body 232 is coupled with the valve spring member 236, for example a cantilever spring, which allows for the regulator valve 222 to be moved from a closed position to an open position, and from the open position to the closed position. The valve spring member 236 can be formed by etching such member in the third layer 206 allowing for a spring-like attachment within the third layer 206. Other options for the valve spring member 236 include, but are not limited to, a deformable member such as a ball, an elastomeric or deflectable region on the fourth layer 208, a member, such as a deformable member below the regulator valve 222, or as part of the fourth layer 208.

In the example shown, the valve spring member 236 and the regular valve 222 are disposed within the high pressure regulator plenum 228. A fourth layer 208 of the fluidic controller 104 is disposed adjacent to the third layer 206, and caps the outer portion of the regulator valve 222, for example the bottom of the regulator valve 222, and optionally provides the high pressure inlet 214 for the fluidic controller 104. The high pressure inlet 214 is fluidly coupled with the high pressure regulator plenum 228, and the low pressure outlet optionally provided by the first layer 202 is fluidly coupled with the low pressure regulator plenum 220, for instance, through ports disposed within the second layer 204 and the third layer 206.

In an example operation of the fluidic controller 104, fluid, such as a fuel, enters the high pressure inlet 214 and pressurizes the high pressure regulator plenum 228. The fuel or other fluid further passes through the normally open regulator valve 222 into the low pressure regulator plenum 220. As the low pressure plenum 220 increases in pressure, the first layer 202 is deflected outward until the actuation member 224 pulls free from the regulator valve 222, closing the regulator valve 222 against the sealing seat 230, and limiting pressure in the low pressure regulator plenum 220. Pressure in the low pressure regulator plenum 220 drops as the fuel or other fluid in the low pressure regulator plenum 220 drains through the low pressure outlet port 216. This causes the first layer 202 to deflect back to its inward position, causing the actuation member 224 to reopen the regulator valve 222 and start the cycle over again.

The fluidic controller 104 shown in FIG. 2 is further discussed in U.S. patent application Ser. No. 12/053,374, which was filed on 21 Mar. 2008, entitled "FLUIDIC CONTROL SYSTEM AND METHOD OF MANUFACTURE," and published as U.S. Patent Pub. 2008/0233446, and which is incorporated herein by reference in its entirety. As discussed in 2008/0233446, the layered structure of the fluidic controllers 104 may also include other flow control elements, such as one or more valves or check valves.

In various examples, the fluidic controllers 104 used in the array 402 include a layered structure having one or more featured layers 200 (FIG. 2), as further discussed in association with FIG. 2. Notably, FIG. 2 illustrates just one example of a suitable thin pressure regulator for use in the array 402. It is contemplated that that other thin pressure regulators or pressure regulating nano-structured materials could also be used in the array 402. As an example, large scale materials or multiple apertures may be utilized.

Figure 6:
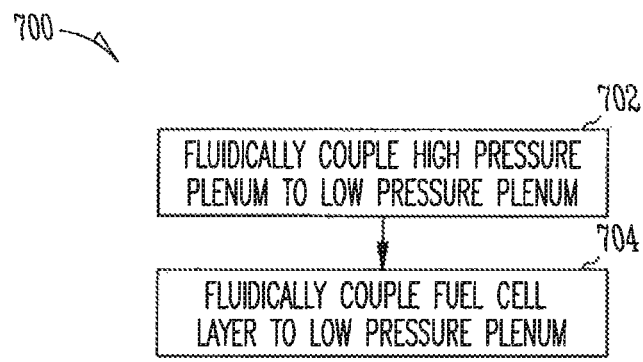
FIG. 6 illustrates a block flow diagram of a method for operating a fuel cell system with at least one embodiment.

Referring to FIG. 6, a block flow diagram 700 of a method of operating a electrochemical cell system is shown, with at least one embodiment. A high pressure plenum may be fluidically coupled 702 to a low pressure plenum. One or more electrochemical cell layers may be coupled 704 to the low pressure plenum.

Fluidically coupling 702 the high pressure system plenum to the low pressure system plenum may include using at least two fluidic controllers. The at least two controllers may be disposed such that the controllers are substantially co-planar with one another or function independently of one another. The array of fluidic controllers may be spatially distributed between the high pressure system plenum and the low pressure system plenum.

Figure 7:
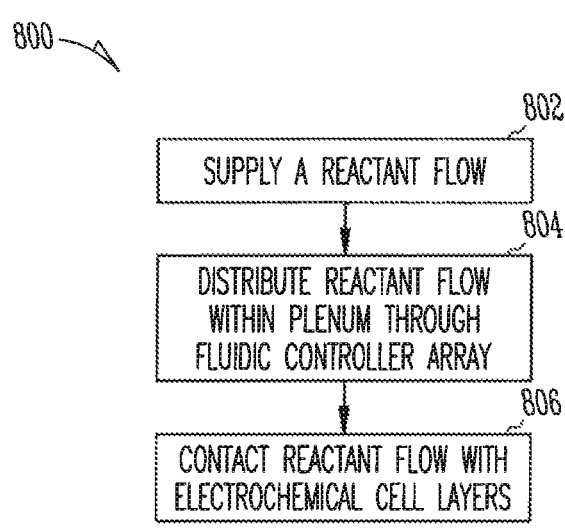
FIG. 7 illustrates a block flow diagram of a method for operating a fuel cell system utilizing a fluidic controller array with at least one embodiment.

Referring to FIG. 7, a block flow diagram 800 of a method of operating a electrochemical cell system utilizing a fluidic controller array is shown, with at least one embodiment. A reactant flow may be supplied 802. The reactant flow may be distributed 804 within one or more plenums through a fluidic controller array to localized regions within one or more reactant plenums through one or more arrays of fluidic controllers and in proximity to one or more electrochemical cell layers. The reactant flow may be contacted 806 with one or more electrochemical cell layers.

Supplying 802 may also include regulating the reactant flow. Regulating may include changing a flowrate of the reactant. The flowrate may be changed in response to a change in power demand of the one or more electrochemical cell layers or unit electrochemical cells in each layer, in response to a change in performance of the one or more electrochemical cell layers or unit electrochemical cells in each layer, or in response to a failure of the one or more electrochemical cell layers or unit electrochemical cells in each layer.

Distributing 804 may include regulating the reactant flow within one or more reactant plenums. Regulating may include changing the pressure of the one or more reactant plenums. The pressure may be changed in response to a change in power demand of the one or more electrochemical cell layers or unit electrochemical cells in each layer, in response to a change in performance of the one or more electrochemical cell layers or unit electrochemical cells in each layer, or in response to a failure of the one or more electrochemical cell layers or unit electrochemical cells in each layer.

Use of an array of fluidic controllers allows for the dimensions of a single electrochemical cell layer to be increased or otherwise changed arbitrarily without resulting in non-uniform fuel flow to one or more anodes of a electrochemical cell layer. On a similar note, the array of fluidic controllers allows for the uniform flow of fuel into and through the anode cavity without requiring the use of explicit flowfield plates, thereby reducing the overall size and potentially the cost of a electrochemical cell system. A uniform fuel flow to the anodes advantageously results in constant electrical component performance. The array of fluidic controllers additionally allows for localized control of an optimal fuel pressure applied to the anodes, while the fluid reservoir can be designed for bulk transport of fuel or other reactant fluids without concern for the effects of the bulk transport pressures on the anodes. Furthermore, the array of fluidic controllers may include a layered structure providing relatively easy, economically feasible, and volumetric-friendly electrochemical cell system manufacture.

It is to be understood that the above Detailed Description is intended to be illustrative, and not restrictive. For instance, any of the aforementioned examples may be used individually or with any of the other examples. Many other examples may be apparent to those of skill in the art upon reviewing the above description. As one example, the present assemblies and methods may find use with other fluidic transfer applications, such as non-fuel or reactant based fluidic applications, where fluid supply at an acceptable pressure with localized control may be desirable. Therefore, the scope of the present systems, assemblies, and methods should be determined with reference to the appended claims, along with the full scope of legal equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, assembly, article, or process that includes elements in addition to those listed after such a term in a claim are still deemed to fall within the scope of such claim.

What is claimed is:

1. A method of generating power, the method comprising: providing a fuel cell system that includes
   a bulk distribution manifold, wherein the bulk distribution manifold includes an inlet;
   a feeding manifold;
   a separation layer disposed between the bulk distribution manifold and the feeding manifold, wherein the separation layer defines at least two independent fluid flow paths, each of the fluid flow paths spanning through the separation layer and communicating with both the bulk distribution manifold and the feeding manifold; and
   one or more planar fuel cell layers, each planar fuel cell layer including an array of unit fuel cells;
   directing fuel through the inlet and into the bulk distribution manifold at a first pressure;
   directing the fuel in the bulk distribution manifold through the independent fluid flow paths and into the feeding manifold; and
   contacting the one or more fuel cell layers with the fuel in the feeding manifold, wherein the fuel contacts the one or more fuel cell layers at a second pressure, wherein the first pressure is greater than the second pressure; and
   wherein each of the independent fluid flow paths include a fluidic controller configured to regulate flow of fluid from the first pressure to the second pressure.

2. The method of claim 1, wherein the one or more planar fuel cell layers includes a plurality of anodes, a plurality of cathodes, and an ion-conducting electrolyte, wherein the plurality of anodes are arranged adjacently on a first side of the planar fuel cell layer and the plurality of cathodes are arranged adjacently on a second side of the planar fuel cell layer opposite the first side, and wherein contacting the one or more fuel cell layers with the fuel in the feeding manifold comprises contacting the plurality of anodes of the one or more planar fuel cell layers with the fuel in the feeding manifold.

3. The method of claim 2, wherein the fuel cell system is a component of a portable electronic device and contacting the one or more fuel cell layers with the fuel produces power for the electronic device.

4. The method of claim 3, further including a fuel reservoir in fluid communication with the inlet.

5. The method of claim 1, wherein the feeding manifold is defined at least in part by the separation layer and the one or more fuel cell layers and wherein the bulk distribution manifold is defined at least in part by the separation layer.

6. The method of claim 3, wherein the separation layer is sealed to the one or more planar fuel cell layers.

7. The method of claim 1, wherein the feeding manifold includes at least two discrete regions, each region served by at least one independent fluid flow path.

8. The method of claim 1, wherein the fluidic controllers have a layered structure that includes a primary pressure regulator coupled to an inlet of the bulk distribution manifold.

9. The method of 8, wherein the layered structure of the fluidic controllers also includes a secondary pressure regulator component and wherein the primary pressure regulator and the secondary pressure regulator components operate at different fluid pressures.

10. The method of claim 1, wherein the fluidic controllers are configured to regulate a fluid parameter selected from the group consisting of: flow rate, pressure, or volume.

11. The method of claim 1, wherein each fluidic controller acts independently of one another.

12. The method of claim 1, wherein the bulk distribution manifold comprises a segmented manifold configured to direct fluid to the at least two independent paths.

13. The method of claim 1, wherein the feeding manifold defines a fluid plenum that is in direct fluidic contact with an anode side of the one or more planar fuel cell layers.

14. The method of claim 1, wherein the feeding manifold includes at least two reactant plenums, each of the reactant plenums associated with one or more of the fluidic controllers.

15. The method of claim 14, wherein each of the reactant plenums is associated with a single fluidic controller.

16. The method of claim 1, wherein the fluidic controllers regulate the flow of fuel by changing the flow rate of the fuel.

17. The method of claim 16, wherein changing the flow rate is in response to a change in power demand of the one or more planar fuel cell layers or unit fuel cells in each layer.

18. The method of claim 16, wherein changing the flow rate is in response to a change in performance of the one or more planar fuel cell layers or unit fuel cells in each layer.

19. The method of claim 1, wherein each fluidic controller is substantially co-planar with one another.

20. The method of claim 1, wherein the fuel is selected from the group consisting of: alcohols, amines, silanes, complex metal hydride compounds, boranes, hydrocarbons, carbazoles, saturated cyclic and polycyclic hydrocarbons, saturated amino boranes or combinations thereof.

21. The method of claim 1, wherein the fuel comprises hydrogen.

22. The method of claim 1, wherein the fluidic controllers have a layered structure that includes at least two featured layers formed by a process selected from the group consisting of: etching, stamping, laser cutting, die cutting, deposition, printing, machining, molding, or electroforming.

* * * * *